(12) United States Patent
Schopfer

(10) Patent No.: US 7,450,360 B2
(45) Date of Patent: Nov. 11, 2008

(54) MULTI-MODE REGULATOR

(75) Inventor: Walter S. Schopfer, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 70 days.

(21) Appl. No.: 11/443,783

(22) Filed: May 31, 2006

(65) Prior Publication Data

US 2007/0279819 A1 Dec. 6, 2007

(51) Int. Cl.
H02H 3/08 (2006.01)
H02H 9/02 (2006.01)
H02H 7/00 (2006.01)
H02H 9/00 (2006.01)
G05F 1/00 (2006.01)

(52) U.S. Cl. .................. 361/93.1; 361/18; 323/222; 323/283; 323/284

(58) Field of Classification Search .............. 361/18, 361/93.1; 323/118, 283–284
See application file for complete search history.

(56) References Cited

U.S. PATENT DOCUMENTS

| | | | | |
|---|---|---|---|---|
| 5,638,440 A | | 6/1997 | Nix et al. ................ | 379/412 |
| 6,163,142 A | * | 12/2000 | Tsujimoto ............... | 323/283 |
| 6,690,792 B1 | * | 2/2004 | Robinson et al. ........ | 379/418 |
| 6,778,663 B1 | | 8/2004 | Schopfer ................ | 379/377 |
| 6,914,978 B2 | * | 7/2005 | Huang et al. ............ | 379/359 |
| 6,946,720 B2 | * | 9/2005 | Beasom .................. | 257/582 |
| 2007/0152647 A1 | * | 7/2007 | Liao ...................... | 323/282 |

* cited by examiner

*Primary Examiner*—Stephen W Jackson
*Assistant Examiner*—Dharti H Patel
(74) *Attorney, Agent, or Firm*—Trop, Pruner & Hu, P.C.

(57) ABSTRACT

In one embodiment, the present invention includes an apparatus having a current sensor to generate an overcurrent output if a current level of a switched power supply is greater than a predetermined threshold, and a pulse width modulation (PWM) controller coupled to the current sensor. At lower load levels, the PWM controller may disable a drive signal to the switched power supply upon receipt of the overcurrent output, but at high load levels the drive signal is not disabled, even in the presence of the overcurrent condition.

16 Claims, 6 Drawing Sheets

MULTI-MODE REGULATOR

FIELD OF THE INVENTION

The present invention relates to power supplies, and more particularly to a switched mode power supply.

BACKGROUND

Electronic circuitry is often powered by electricity received from line currents. To condition the incoming line current to one or more desired voltages at which circuitry operates, oftentimes a voltage regulator is present. Although many different types of voltage regulation circuits exist, a common regulator found in electronic equipment is a switched mode power supply (SMPS). Such a power supply receives an incoming voltage, i.e., an unregulated voltage at a first voltage level and converts the voltage to one or more desired voltage levels, which may be higher or lower than the input voltage level. The SMPS further regulates the output voltage level to reduce the effects of spikes or surges on the line.

Switched mode power supplies typically include a switching transistor that is switched on and off by a drive signal, e.g., it is controlled in a pulse width modulated (PWM) manner. When the switching transistor is on, a voltage is provided to charge an inductive mechanism in the power supply such as one or more inductors or coils of a transformer. When the drive signal is switched off, the inductive mechanism discharges to provide the desired voltage.

While such switched mode power supplies are suitable for many applications, their application becomes difficult when a load that is coupled to the power supply requires widely differing power levels in different modes of operation. To provide the desired multiple voltages, various mechanisms are used, including the presence of multiple inductors that are switched into or out of the power supply based upon the required load. However, the presence of multiple inductors increases the size of the power supply. Furthermore, switching of the multiple inductors increases complexity. Alternately, external control may be provided to change a switching frequency (i.e., duty cycle) of the switched mode power supply based on changes in the operation mode of the load. However this also presents complexities. A need thus exists for improved regulation of power to a load.

SUMMARY OF THE INVENTION

In one aspect, the present invention is directed to an apparatus that includes a current sensor to generate an overcurrent output if a current level of a switched power supply is greater than a predetermined threshold, and a pulse width modulation (PWM) controller coupled to the current sensor. At lower load levels, the PWM controller may disable a drive signal to the switched power supply upon receipt of the overcurrent output, but at high load levels the drive signal is not disabled, even in the presence of the overcurrent condition. To effect such operation, a lockout circuit may be coupled between the current sensor and the PWM controller to prevent the overcurrent output to the PWM controller, e.g., according to predetermined interval. In this way, when the lockout circuit is active, a duty cycle limit on the drive signal is removed.

In some implementations, the switched power supply may include a single inductor that can generate inductive currents to drive loads having variable power requirements. The single inductor may be sized to optimize power consumption in a medium load mode of a variable load. As one example, a load may be a subscriber line interface circuit (SLIC).

Another aspect of the present invention is directed to an apparatus including a means for generating a drive signal to a switched power supply according to a duty cycle, and a means for allowing the drive signal to remain active for longer than the duty cycle and without a duty cycle limit in a high power mode of a load. The apparatus may further include a sensing means to sense an inductive current of the switched power supply and generate an output signal. The output signal may cause the drive signal to be disabled if the output signal exceeds a predetermined level. However, at high load conditions, the output signal may be deactivated during a portion of a reference signal.

Yet another aspect of the present invention is directed to a method for automatically generating a drive signal for a switched power supply at a first duty cycle at a first load level of a load coupled to the switched power supply, and automatically generating the drive signal without a duty cycle limit at a higher load level of the load.

Still other embodiments are directed to a system including a voltage regulator having circuitry, programmed logic, software, firmware or the like to prevent a current sense output to a PWM controller of the regulator at a periodic rate. In this way, an overcurrent may be allowed to occur in the regulator to power a load when it requires higher power levels. The system may take various forms including, for example, a voice over internet protocol modem, a line card or the like. In such systems, a SLIC may be powered by the regulator.

DETAILED DESCRIPTION

In various embodiments, a power supply may be controlled to provide various power loads depending on operating conditions of a load coupled to the power supply. The varying power loads may be provided by automatically changing a duty cycle of the power supply. Furthermore, a single inductive mechanism may be used in the power supply to generate an inductive current. Depending on a power requirement of the load, this inductive current may vary from a very low amount to a current that exceeds a predetermined threshold at which the switching transistor would normally be turned off. In this way, a heavy load may be powered by the power supply by removing a limit on the duty cycle and allowing an overcurrent condition to occur. That is, a maximum duty cycle limit of a power supply, which may be between 50% and 70% in some implementations, may be surpassed such that for heavy loads, a switched on-time for a switching transistor allows the overcurrent condition to exist at least temporarily, to achieve the needed power levels. Thus a power supply may operate at high power levels without a duty cycle per se, as the control of the switching transistor is not limited according to a regular duty cycle but instead is limited (i.e., switched off) after an overcurrent condition is detected and depending on a state of a sense disable signal, discussed further below.

Figure 1:
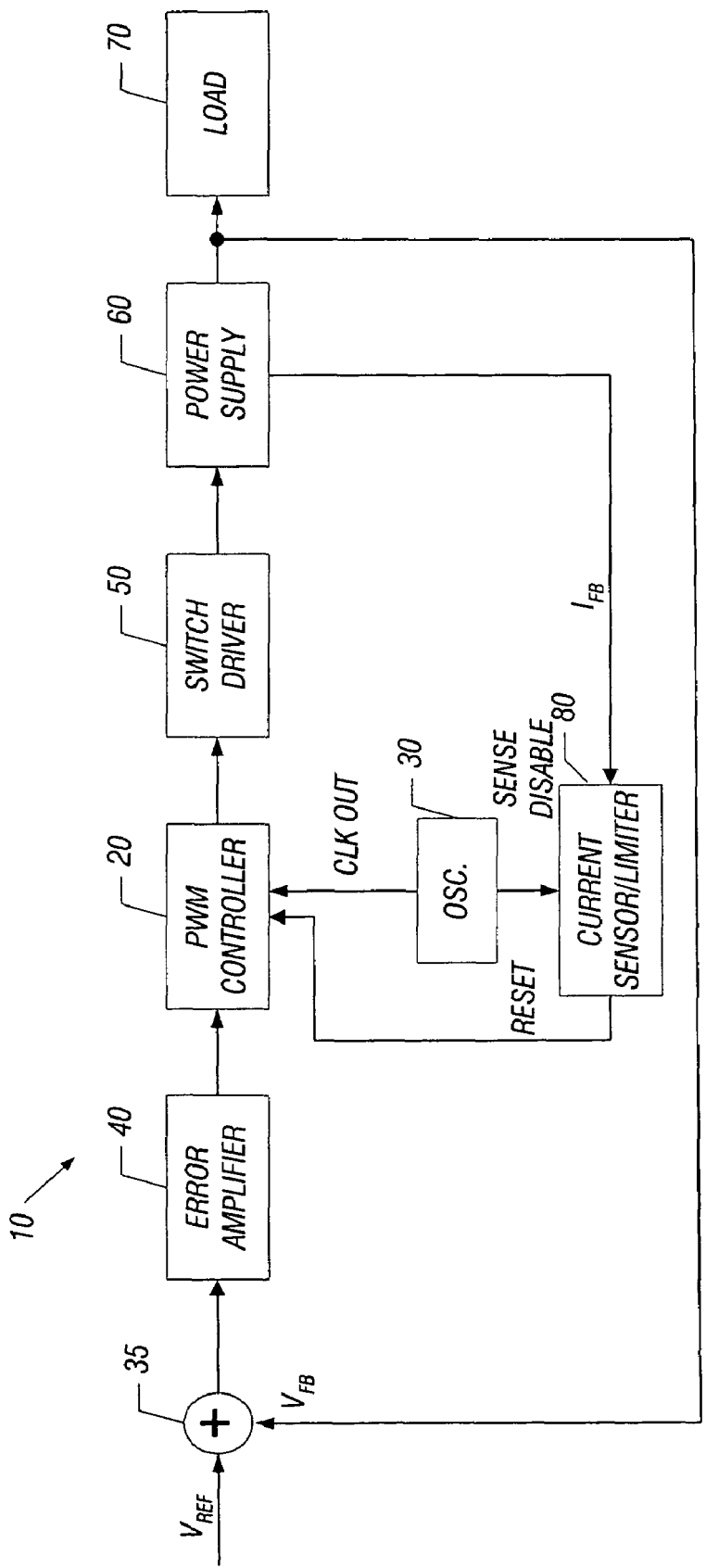
FIG. 1 is a block diagram of a system in accordance with one embodiment of the present invention.

Referring now to FIG. 1, shown is a block diagram of a system in accordance with one embodiment of the present invention. As shown in FIG. 1, system 10 may be used to provide a regulated voltage to a load such as a line card or other device including a subscriber line interface circuit (SLIC). Such a SLIC may operate in multiple modes of operation. For example, different power levels are required by a SLIC depending on its mode of operation. That is, when a phone or other subscriber equipment to which the SLIC is coupled is on hook, very low power is required. During a talk mode, a modest level of power consumption is required. When the SLIC performs ringing for the subscriber equipment, a high power requirement is needed. For example, power requirements can range from approximately 0.8 watts for talk mode (with on-hook conditions having an even lower power requirement, e.g., less than 100 milliwatts), while ringing mode can require significantly greater power, e.g., on the order of 10 times the power, for example, 7 watts. Of course, in other embodiments many other different types of loads may be powered by a voltage regulator in accordance with an embodiment of the present invention.

As shown in FIG. 1, a power supply 60 which may be a switched mode power supply is coupled to provide a regulated voltage to a load 70. As discussed, load 70 may be a line card including a SLIC or any other such device requiring a regulated voltage. In many implementations, load 70 may require different power levels depending on mode of operation. For example, with respect to a SLIC, different power levels are required based on different modes of operation. Accordingly, power supply 60 may provide different power outputs based on power needed by load 70.

To enable delivery of a regulated voltage at a given level, a switch driver 50 may be coupled to power supply 60. Switch driver 50 may provide a switch signal to alternately enable and disable a drive signal for a switching transistor within power supply 60. To generate this switch signal, switch driver 50 may be coupled to receive a control signal from a pulse width modulation (PWM) controller 20.

PWM controller 20 may be configured to generate a logic control signal for output to switch driver 50 to enable switching of the switching transistor at a desired duty cycle. The duty cycle may vary in different embodiments. As will be described further below, given the different power requirements of a load to which power supply 60 may be coupled, PWM controller 20 may automatically alter the duty cycle to enable longer (or shorter) on-times for the switching transistor based on the power required by load 70. At high power levels, the duty cycle is essentially removed. In turn, this enables an inductive element within power supply 60, e.g., an inductor or a transformer to generate a greater (or smaller) inductive current, enabling greater (or smaller) output power as needed.

In operation, PWM controller 20 performs a comparison between several input signals. Specifically, PWM controller 20 is coupled to receive a DC voltage from an error amplifier 40. As shown in FIG. 1, a feedback voltage, $V_{FB}$, from power supply 60 may be coupled to a summing block 35 which further receives a reference voltage, $V_{REF}$. Summing block 35 thus outputs a result of a comparison between the feedback voltage and the reference voltage. This result, i.e., an error signal, is coupled to error amplifier 40 (which may include a hash filter), which in turn generates an amplified error output signal (i.e., a DC output) indicative of the output voltage from power supply 60.

PWM controller 20 is further coupled to receive a reference signal to compare to the DC voltage. Although the scope of the present invention is not limited in this regard, in the embodiment of FIG. 1, the reference signal may be a signal received from an oscillator 30. More specifically, an oscillator 30 may provide an output signal, e.g., a clock output signal (CLKOUT) to PWM controller 20. In various embodiments, this output signal from oscillator 30 may be a triangle-shaped waveform (e.g., a saw tooth signal), although the scope of the present invention is not limited in this regard. For example, in other implementations the clock output may be another such shaped signal.

PWM controller 20 may compare the value of the DC voltage to the clock output signal, and based on this comparison, generate an output to switch driver 50 that in turn controls the switching transistor of power supply 60. In the embodiment of FIG. 1, when the value of the clock output signal exceeds the value of the error amplifier output (i.e., DC voltage), PWM controller 20 disables its output and in turn disables the output of switch driver 50.

PWM controller 20 has a maximum duty cycle that is set to a limit, generally of no more than 50% to 70%. This maximum duty cycle thus causes the output of PWM controller 20 to be disabled when this limit is reached, even when the DC voltage exceeds the clock signal. Such a maximum duty cycle limit prevents damage to components or other undesirable conditions.

A further limit on the duty cycle can occur when an overcurrent condition is detected in the inductive current generated in power supply 60. Current sensor/limiter 80 (hereafter current sensor 80) may be used to sense an inductive current of power supply 60. This inductive current may be received as a feedback signal, $I_{FB}$, received from power supply 60. Current sensor 80 may include circuitry such as a comparator to measure the value of the feedback current to a predetermined threshold. Current sensor 80 may generate an output signal to PWM controller 20, i.e., a reset signal to cause PWM controller 20 to disable the drive signal if the feedback current is greater than the predetermined threshold. This threshold may vary depending on a system and power levels needed for the system.

However, because load 70 may operate at various power consumption levels, it is possible that the inductive current generated in power supply 60 is insufficient to generate the power needed by load 70. Accordingly, in various embodiments current sensor 80 may include so-called lockout circuitry to prevent transmission of the reset signal if the inductive current reaches the predetermined threshold in a given cycle. By preventing the reset signal, the control signal from PWM controller 20 that in turn generates the drive signal to the switching transistor may remain on, effectively removing a maximum limit on the duty cycle.

The lockout mechanism may prevent transmission of the reset signal, which in turn enables the drive signal to the switching transistor of power supply 60 to remain on for a longer time (and thus essentially removing the duty cycle), increasing the inductive current and thus increasing the regulated power output of power supply 60. In one embodiment, oscillator 30 further may generate a sense disable signal that is output to current sensor 80. In one embodiment, the sense disable signal may be a square wave that is generated in synchronization with the clock output. When activated, the sense disable signal may enable the lockout mechanism. Note that in some implementations, the lockout mechanism may be hardware-based, while in other embodiments, the lockout mechanism may be implemented in firmware, software, or a combination thereof.

In various implementations, all of the components shown in FIG. 1 may be implemented in a single integrated circuit. That is, a single substrate may include both the power supply, its control structures and a load to be powered by the power supply. In many implementations, the circuitry of this IC may be formed on a single substrate using a process that can form various structures including, e.g., bipolar transistors and metal oxide semiconductor field effect transistors (MOSFETs). While described with this particular implementation in the embodiment of FIG. 1, it is to be understood that the scope of the present invention is not so limited.

Figure 2:
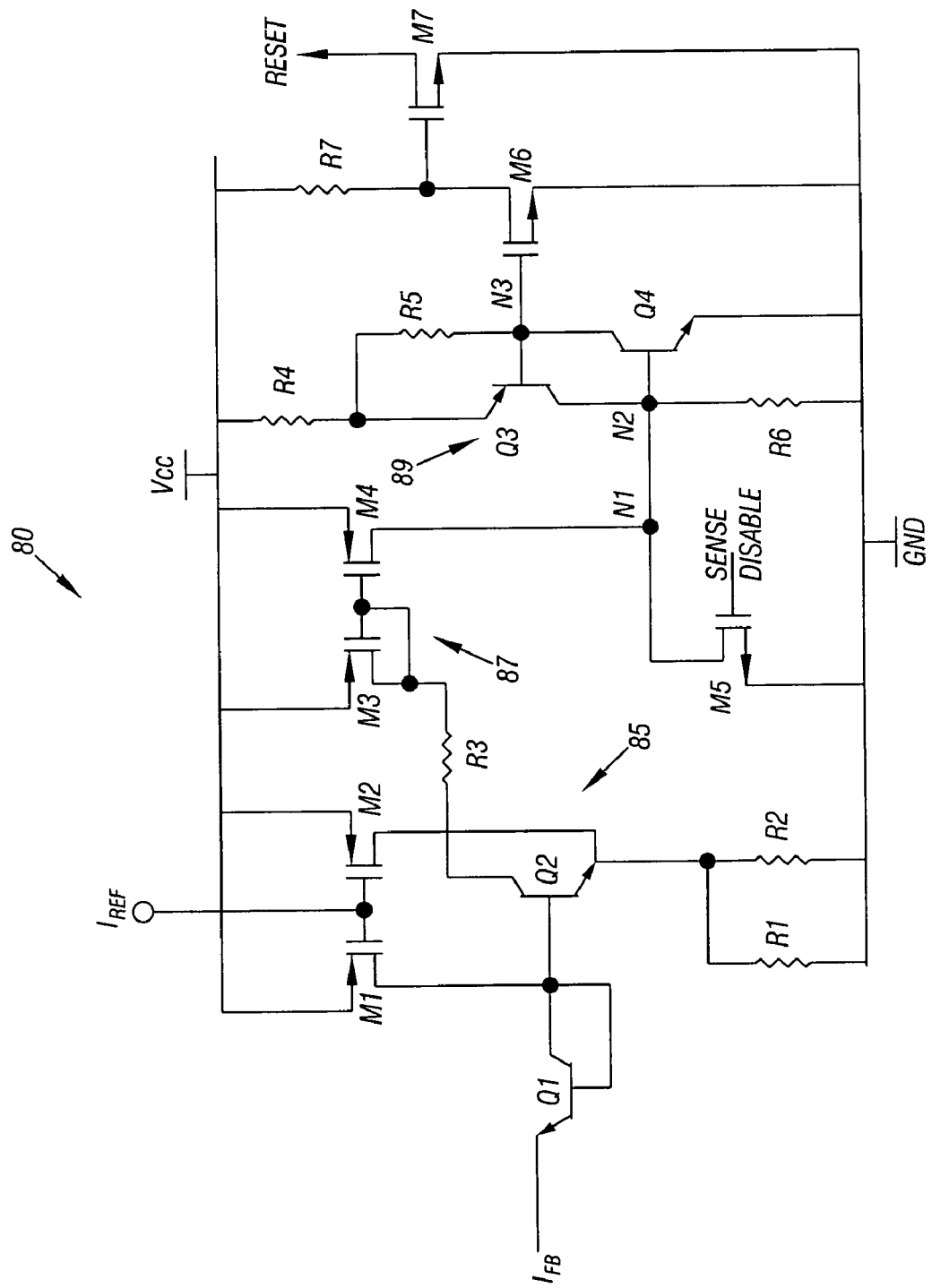
FIG. 2 is a schematic diagram of a current sensor and lockout mechanism in accordance with one embodiment of the present invention.

Referring now to FIG. 2, shown is a schematic diagram of a current sensor and lockout mechanism in accordance with one embodiment of the present invention. As shown in FIG. 2, current sensor 80 performs current sensing of a feedback current from the power supply. For example, with reference back to FIG. 1, feedback current $I_{FB}$ is fed back from power supply 60. While the feedback current may take various forms, in many embodiments, a current may be tapped from an inductor or other location within a power supply. As shown in FIG. 2, the feedback current $I_{FB}$ is coupled to an emitter terminal of a first transistor Q1. As shown in FIG. 2, first transistor Q1 maybe a NPN bipolar transistor, although the scope of the present invention is not limited in this regard. Transistor Q1 has its base terminal coupled in a diode-connected manner to its collector terminal, which in turn is further coupled to a base terminal of a second transistor Q2, which may also be a NPN transistor. Transistor Q2 has its emitter terminal coupled to a drain terminal of a transistor M2, which may be a pMOSFET transistor, although the scope of the present invention is not limited in this regard. MOSFET M2 has its gate terminal commonly coupled with a gate terminal of a first MOSFET transistor M1, which may also be a pMOSFET. The common gate is coupled to receive a reference current $I_{REF}$ which may be received from a voltage source, and may correspond to a predetermined threshold level which, in one embodiment may correspond to approximately a 3A level. Note that the source terminals of MOSFETs M1 and M2 are coupled to a supply voltage, i.e., $V_{cc}$.

The emitter terminal of transistor Q2 is further coupled to a parallel stack of resistors R1 and R2. In this way, a collector terminal of transistor Q2 provides an output indicative of the incoming feedback current by way of a current comparator 85 generally formed from transistors Q1 and Q2 and MOSFETs M1 and M2. Understand however that a current may be measured in other manners in other embodiments.

Still referring to FIG. 2, the collector terminal of transistor Q2 is coupled to a resistor R3 which in turn is coupled to a current mirror 87 formed of a MOSFET M3 and a MOSFET M4. As shown in the embodiment of FIG. 2, M3 and M4 may be pMOSFETs having common gate and source terminals. The drain terminal of MOSFET M4 is coupled to a node N1 that is also coupled to a drain terminal of a MOSFET M5, which may be a nMOSFET having a source terminal coupled to ground and a gate terminal coupled to receive a sense disable signal. As described above with regard to FIG. 1, the sense disable signal may be received from oscillator 30 that also provides a clock signal to PWM controller 20. The sense disable signal may be a square wave having a period substantially equal to the period of the clock signal. Accordingly, a high and low pulse of the sense disable signal is generated for each period of the clock signal generated by oscillator 20. Node N1 is further coupled to a node N2 coupled to a latch formed of a third bipolar transistor Q3 and a fourth bipolar transistor Q4. This PN latch along with the remaining components of a lockout mechanism 89 may thus act to lock out the sensed current based on the control signal, i.e., sense disable signal, received from oscillator 30.

More specifically, lockout mechanism 89 includes, in addition to MOSFET M5, third and fourth bipolar transistors Q3 and Q4 which are coupled as a PN latch. As shown in FIG. 2, PNP transistor Q3 has a collector terminal coupled to node N2 which is further coupled to ground via a resistor R6 and a base terminal of NPN transistor Q4. Q4 further has its emitter terminal coupled to ground. In turn, the collector terminal of transistor Q4 is coupled to the base terminal of transistor Q3. Transistor Q3 further has its emitter terminal coupled to a pair of resistors R4 and R5, coupled between the supply voltage and a node N3. In turn, node N3 is coupled to a gate terminal of a MOSFET M6, which may be an nMOSFET having a source terminal coupled to ground and a drain terminal coupled to a resistor R7 and a gate terminal of another nMOSFET M7. In turn, the source terminal of MOSFET M7 is coupled to ground and the drain terminal of MOSFET M7 is coupled to provide the reset pulse.

As described above with regard to FIG. 1, this reset signal may be coupled to PWM controller 20. When at its active low state, the reset signal causes the output of PWM controller 20 to disable the drive signal of the switching transistor (i.e., of power supply 60). In this way, when an overcurrent condition is sensed, current sensor 80 generates the active low reset signal to disable the drive signal to the switching transistor, thus preventing the inductive mechanism of power supply 60 from further charging.

However, by provision of lockout mechanism 89, the output of current comparator 85 (which drives the reset signal) is prevented from generating the active low state output of current sensor 80 when the active high sense disable signal is present at the gate of MOSFET M5. Accordingly, the output of current sensor 80 stays inactive (even when an overcurrent condition is sensed), when the sense disable signal is activated. Accordingly, a switch signal to drive the switching transistor remains on, allowing greater inductor current to be generated in power supply 60, thus enabling sufficient power to drive load 70 in high power conditions such as in a ringing mode of a SLIC that forms load 70. The presence of the PN latch formed by transistors Q3 and Q4 thus causes the output from current sensor 80, i.e., the reset signal to remain high, even when the sense disable signal switches to an inactive low state. In turn, PWM controller 20 maintains the drive signal to the switching transistor of power supply 60 until an overcurrent condition is detected in the absence of the sense disable signal.

While described with this particular implementation it is to be understood that the scope of the present invention is not limited in this regard. Thus, while FIG. 2 shows an implementation having both bipolar and MOSFET devices, other implementations can use exclusively bipolar devices or MOSFET devices. Of course different active high and low states may be used to drive and disable drive signals. Furthermore, in addition to a pure hardware-based approach, logic in the form of preprogrammed logic software or firmware may be used to implementing a lockout feature in accordance with an embodiment of the present invention.

Figure 3:
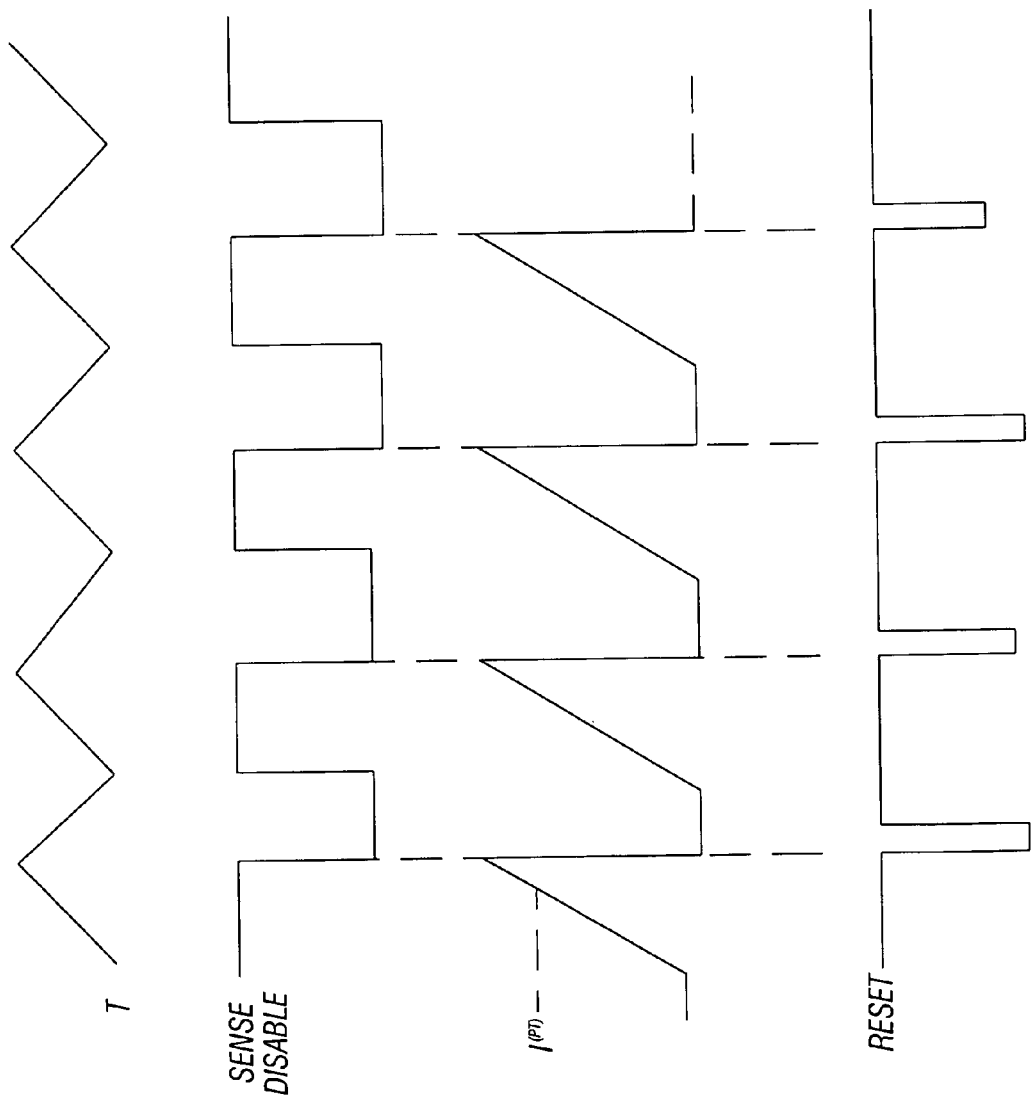
FIG. 3 is a timing diagram of various operations occurring during use of a system in accordance with an embodiment of the present invention.

Referring now to FIG. 3, shown is a timing diagram of various operations occurring during use of a system including a current sensor with a lockout mechanism in accordance with an embodiment of the present invention. The timing diagram of FIG. 3 more particularly shows operation during a high power mode of operation of a load coupled to the power supply. As shown in FIG. 3, a triangle waveform T is generated, e.g., in oscillator 30 of FIG. 1. This waveform may be used by PWM controller 20 to generate the desired duty cycle, which leads to switching on and off of the associated switching transistor of the power supply in accordance with a comparison between waveform T and a value of the DC feedback voltage (not shown in FIG. 3). Also shown in FIG. 3 is the inductive current generated in a switched mode power supply, e.g., power supply 60. As shown in FIG. 3, this current I rises from zero current to a current which exceeds a predetermined threshold PT.

More specifically, such overcurrent may be generated when the power supply is operating to provide sufficient power that is needed for high power operation of a variable load to which it is coupled, e.g., a SLIC during ringing mode. To enable the current to exceed this predetermined threshold, a control signal to disable an overcurrent signal (shown as Reset in FIG. 3) detected in a current sensor may be present. Specifically, as shown in FIG. 3, the sense disable signal (which may also be generated by oscillator 30 of FIG. 2) in its active state prevents an overcurrent signal from being output from current sensor 80. Accordingly, when the sense disable signal is active high, the lockout mechanism prevents the overcurrent signal, i.e., the reset signal, from being sent to PWM controller 20. However, when the sense disable signal goes active low, the lockout mechanism is disabled, and the reset signal is allowed to pass to PWM controller 20, which causes PWM controller 20 to disable the drive signal to the switching transistor of power supply 60.

Figure 4:
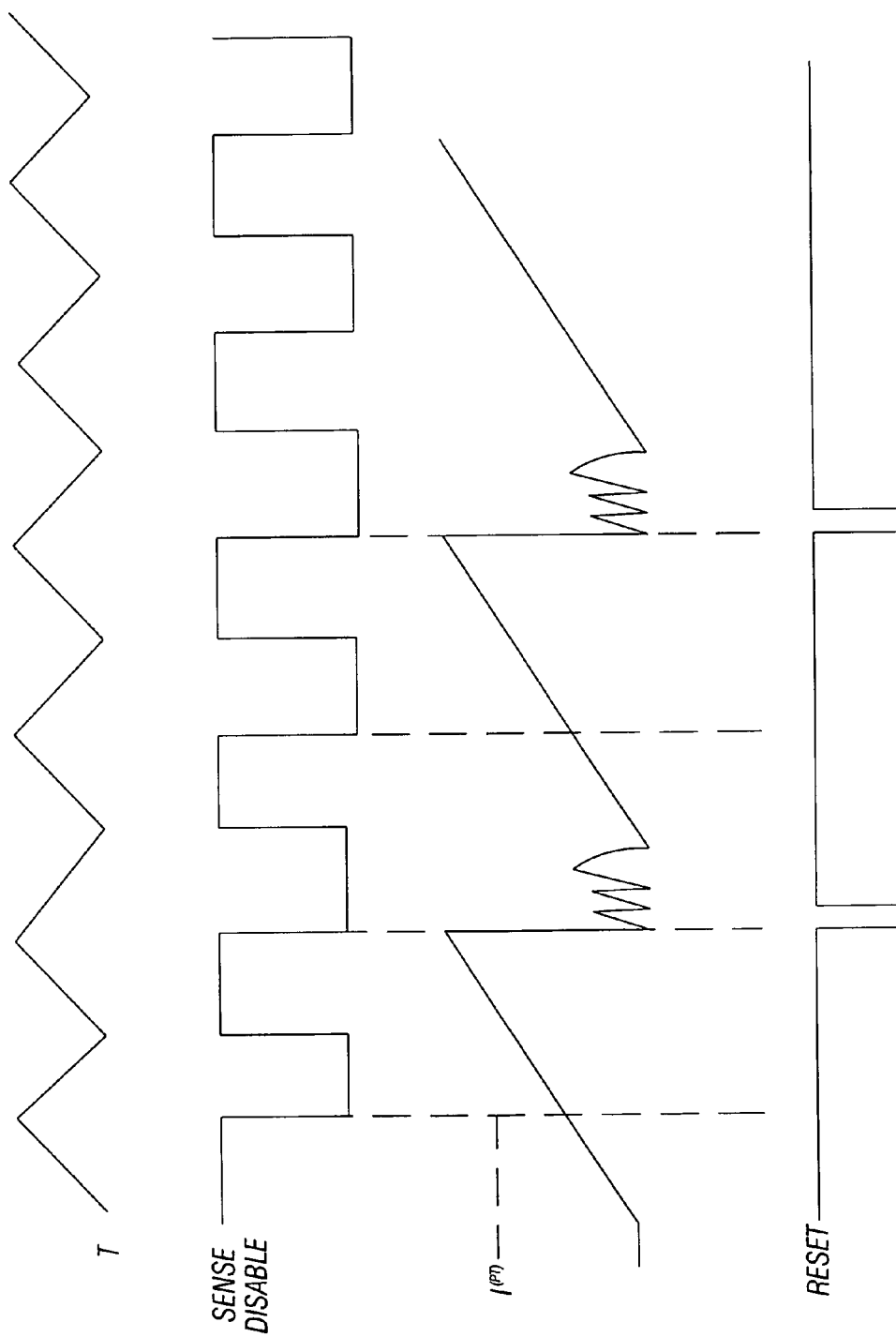
FIG. 4 is a timing diagram of various operations occurring during use of a system in accordance with another embodiment of the present invention.

Referring now to FIG. 4, shown is a timing diagram of operation of a power supply in accordance with an other embodiment of the present invention. Note that the timing diagram of FIG. 4 includes the same signals as timing diagram of FIG. 3. However, in the embodiment of FIG. 4, note that the inductive current varies more widely, and can take many cycles of the Sense Disable signal (and similarly, waveform T) in order to reach an overcurrent level. Thus note that the Reset signal is irregularly produced. Furthermore, the drive signal to the switching transistor of the power supply (not shown in FIG. 4) is on for varying amounts of time. That is, the drive signal is enabled without a duty cycle limit. While not drawn to scale, in heavy loads it is possible for the drive signal to be enabled virtually 100%. Furthermore, based on the comparison between the DC output and the clock signal, the drive signal can be enabled and disabled at irregular intervals and not according to any duty cycle.

While the timing diagrams shown in FIGS. 3 and 4 are representative implementations, it is to be understood that the scope of the present invention is not limited in this regard and other manners of allowing an overcurrent to build up in a power supply to enable high power operation of a variable load may be realized.

Figure 5:
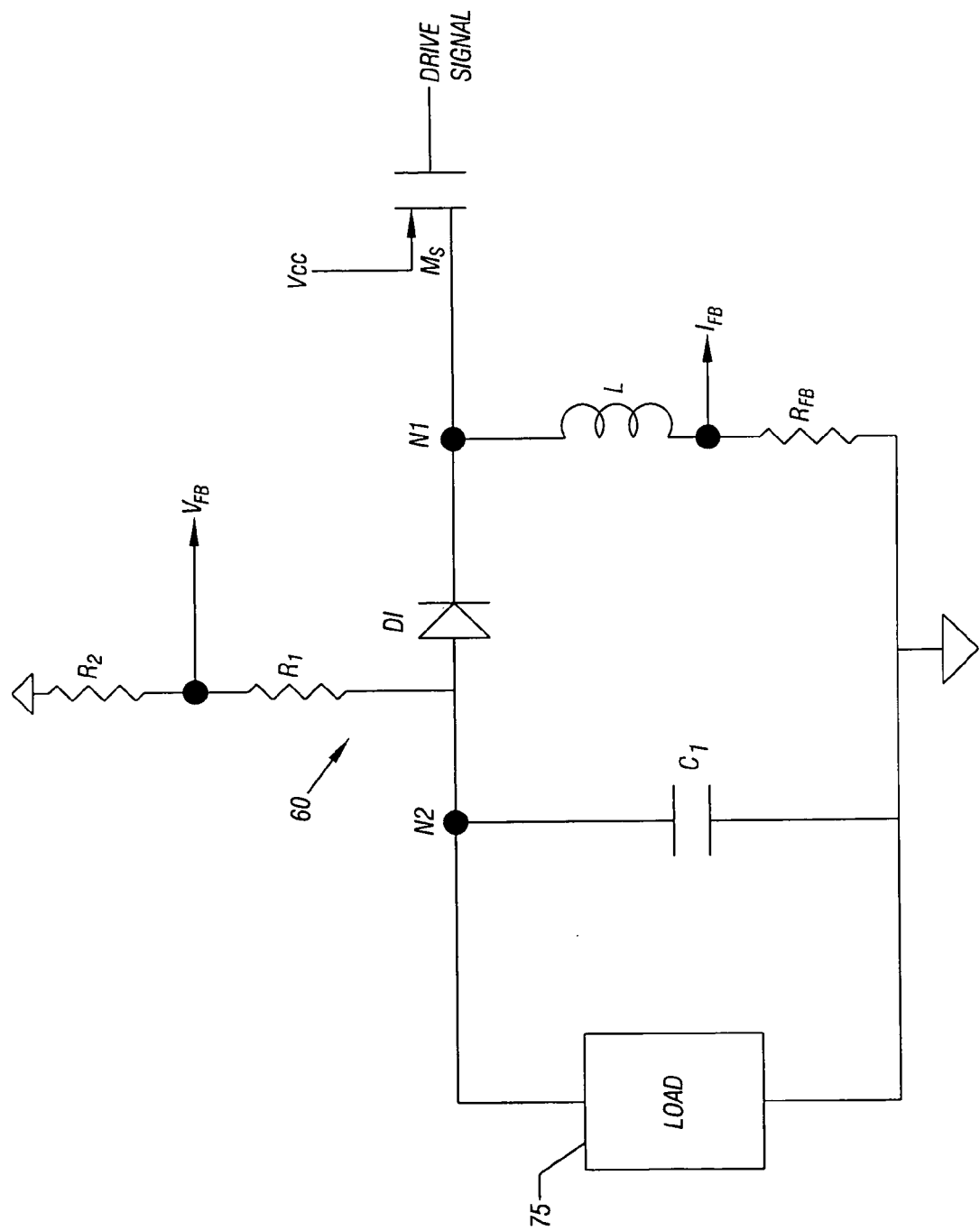
FIG. 5 is a schematic diagram of a power supply in accordance with an embodiment of the present invention.

Referring now to FIG. 5, shown is a schematic diagram of a power supply in accordance with an embodiment of the present invention. As shown in FIG. 5, power supply 60 may be used to provide a negative voltage to a load 75, e.g., a SLIC that requires a negative voltage. However, it is to be understood that the scope of the present invention is not limited in this regard and in other implementations a current limiter disable mechanism may be used with positive-based power supplies.

As shown in FIG. 5, a switching transistor, $M_S$ which may be a pMOSFET in one embodiment is gated by a drive signal. This drive signal may be the output of a switch driver coupled to power supply 60. When on, the switching transistor passes a supply voltage, which may be an unregulated supply voltage $V_{cc}$ coupled to its source terminal through its drain terminal. In turn, the voltage may be used to charge an inductor L coupled to $M_S$ at a node N1. In various implementations, a single inductor L, which in the embodiment of FIG. 5 acts as a flyback inductor, may be present that can handle power requirements across a wide range. In these implementations, the single inductor may be optimized for a normal mode of operation of a load. For example, the normal mode of operation may correspond to a middle voltage level between a lowest voltage level and a highest voltage level of the load. By optimizing coil size for this normal mode of operation, efficient operation may be effected and size of the power supply controlled accordingly. In other embodiments, instead of an inductor, coils of a transformer may be provided as an inductive mechanism. To obtain a feedback current ($I_{FB}$) for use in measuring the inductive current, a feedback resistor, $R_{FB}$, which may be a small resistor, e.g., a 0.1 ohm resistor may be coupled to inductor L.

In turn, a diode D1 is coupled between node N1 and a second node N2, which in turn has a filter capacitor C1 coupled between it and ground. Note that a resistor divider formed of resistors R1 and R2 may be coupled between diode D1 and node N2 to generate a feedback voltage (i.e., $V_{fb}$). This feedback voltage may be provided to an error amplifier, e.g., error amplifier 40 of FIG. 1.

A load 75, which may be a SLIC or other circuit requiring a negative voltage, is coupled between node N2 and ground. In this way, when gated by the drive signal, the unregulated supply voltage is switched into the circuit to generate the inductive current in inductor L. When the drive signal gates off the switching transistor, inductor L discharges into load 75, as filtered by capacitor C1. Of course other implementations of a power supply are possible, including a supply to generate a positive voltage.

Figure 6:
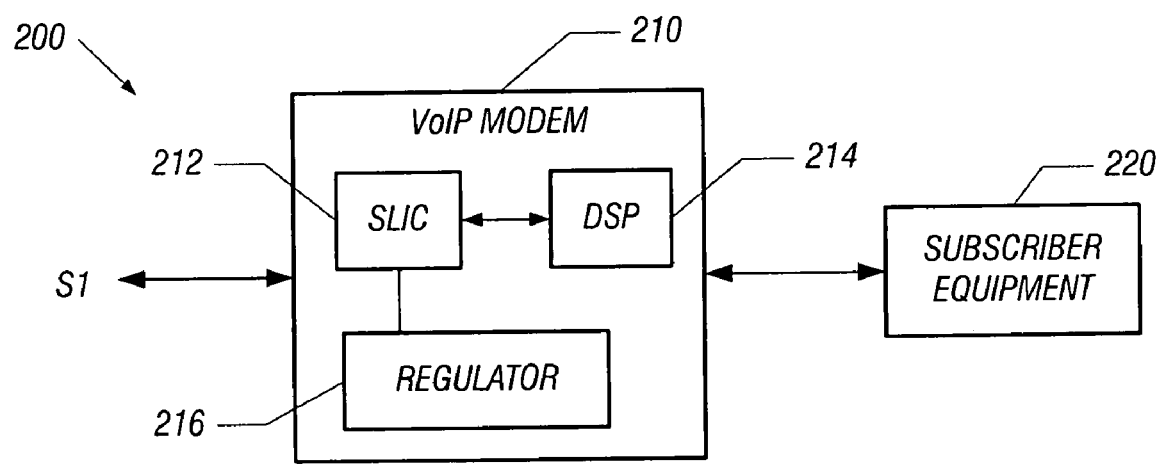
FIG. 6 is a block diagram of a system in accordance with another embodiment of the present invention.

A voltage regulator including a lockout mechanism as disclosed herein may be used in many different types of systems. For example, a voltage regulator may be used with a load such as a SLIC or other telephone circuitry. In certain contexts, the voltage regulator may be implemented in a system such as a voice over Internet protocol (VoIP) implementation, such as a VoIP modem coupled between a subscriber loop and subscriber equipment. Specifically, as shown in the embodiment of FIG. 6, such a VoIP modem 210, which may include voltage regulator circuitry 216 in accordance with an embodiment of the present invention, may be coupled between a subscriber loop S1 and subscriber equipment 220, which may correspond to a telephone, computer system, or other communication device, in various embodiments. As shown in FIG. 6, modem 210 further includes a DSP 214 coupled to a SLIC 212. In the embodiment of FIG. 6, SLIC 212 may be powered by regulator 216, while DSP 214 may be powered by another source that provides, e.g., a 5V or 3.3V regulated level. In some embodiments, at least SLIC 212 and regulator 216 may be integrated on a substrate of a single integrated circuit.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a current sensor to generate an overcurrent output if a current level of a switched power supply is greater than a predetermined threshold;
   a pulse width modulation (PWM) controller coupled to the current sensor, wherein the PWM controller is to receive a clock signal from an oscillator and to disable a drive signal to the switched power supply upon receipt of the overcurrent output; and a lockout circuit activated responsive to a sense disable signal from the oscillator, to prevent the overcurrent output to the PWM controller, the lockout circuit including a first metal oxide semiconductor field effect transistor (MOSFET) gated by the sense disable signal, a PN latch coupled to an output terminal of the first MOSFET, a second MOSFET gated by the PN latch, and a third MOSFET gated by an output of the second MOSFET, the third MOSFET to provide the overcurrent output when the sense disable signal is inactive, wherein the lockout circuit when active is to remove a duty cycle limit on the drive signal.

2. The apparatus of claim 1, wherein the lockout circuit includes a latch circuit coupled between the current sensor and the PWM controller.

3. The apparatus of claim 2, wherein the lockout circuit is to reset the latch circuit based on the state of the sense disable signal generated in synchronization with the clock signal.

4. The apparatus of claim 3, wherein the lockout circuit is to prevent the overcurrent output during a first portion of a cycle of the clock signal.

5. The apparatus of claim 4, wherein the lockout circuit is to enable the overcurrent output during a second portion of the cycle of the clock signal.

6. The apparatus of claim 1, wherein the switched power supply includes a single inductor.

7. The apparatus of claim 6, wherein the single inductor is sized to optimize power consumption in a medium load mode of a variable load coupled to the switched power supply.

8. The apparatus of claim 1, wherein the switched power supply is coupled to a subscriber line interface circuit (SLIC), and wherein the lockout circuit is to prevent the overcurrent output during at least a portion of a ringing mode of the SLIC.

9. An apparatus comprising:
means for generating a drive signal to a switched power supply according to a duty cycle;
means for allowing the drive signal to remain active for longer than the duty cycle and without a duty cycle limit in a high power mode of a load coupled to the switched power supply;
means for sensing an inductive current of the switched power supply, the means for sensing to generate an output signal indicative of the inductive current, wherein the means for generating is coupled to receive the output signal and to generate the drive signal, wherein the means for generating is to disable the drive signal if the output signal exceeds a predetermined level; and
means for preventing coupled to the means for sensing, the means for preventing to prevent the output signal during a portion of a first reference signal.

10. The apparatus of claim 9, further comprising clock means coupled to provide the first reference signal to the means for preventing and to provide a second reference signal to the means for generating.

11. The apparatus of claim 9, wherein the switched power supply includes a single inductor to generate the inductive current.

12. The apparatus of claim 11, wherein the single inductor is sized to optimize operation at a middle voltage level of low, middle, and high voltage levels at which a load coupled to the switched power supply can operate.

13. A system comprising:
a voltage regulator having:
a current sensor to generate an overcurrent output if a current level of the voltage regulator is greater than a predetermined threshold;
a pulse width modulation (PWM) controller coupled to the current sensor, wherein the PWM controller is to generate a drive signal to a switch of the voltage regulator based on a comparison between a clock signal and a voltage indicative of the voltage regulator output voltage and to disable the drive signal upon receipt of the overcurrent output; and
a lockout circuit to prevent the overcurrent output to the PWM controller responsive to a disable signal generated synchronously with the clock signal; and a subscriber line interface circuit (SLIC) coupled to the voltage regulator.

14. The system of claim 13, wherein the system comprises a voice over internet protocol modem.

15. The system of claim 13, wherein the lockout circuit is to prevent the overcurrent output during a first portion of a cycle of the clock signal, wherein the lockout circuit is to enable the overcurrent output during a second portion of the cycle.

16. The system of claim 13, wherein the voltage regulator and the SLIC are integrated in a single integrated circuit.

* * * * *